United States Patent [19]

Meeh

[11] Patent Number: 5,094,808
[45] Date of Patent: Mar. 10, 1992

[54] OXYGEN ACTIVATION DOWNHOLE TOOL

[75] Inventor: David E. Meeh, Englewood, Colo.

[73] Assignee: Schlumberger Technology Corporation, Houston, Tex.

[21] Appl. No.: 453,646

[22] Filed: Dec. 20, 1989

[51] Int. Cl.$^5$ ............................................. G21G 1/06
[52] U.S. Cl. .................................... 376/158; 376/166
[58] Field of Search ............... 376/159, 158, 160, 166, 376/161, 162, 163, 164, 165

[56] References Cited

U.S. PATENT DOCUMENTS

| | | | |
|---|---|---|---|
| 2,963,587 | 12/1960 | Rickard | 376/160 |
| 3,379,882 | 4/1968 | Youmans | 250/270 |
| 3,514,598 | 5/1970 | Youmans | 376/162 |
| 3,710,112 | 1/1973 | Caldwell et al. | 376/164 |
| 3,817,328 | 6/1974 | Neuman | 376/166 |
| 4,005,290 | 1/1977 | Allen | 376/166 |
| 4,032,778 | 6/1977 | Paap et al. | 376/166 |
| 4,032,779 | 6/1977 | Arnold et al. | 376/166 |
| 4,032,780 | 6/1977 | Paap et al. | 376/166 |
| 4,032,781 | 6/1977 | Arnold | 376/166 |
| 4,076,980 | 2/1978 | Arnold et al. | 376/166 |
| 4,169,979 | 10/1979 | Arnold et al. | 250/259 |
| 4,189,638 | 2/1980 | Arnold | 250/259 |
| 4,233,508 | 11/1980 | Arnold | 376/159 |
| 4,501,964 | 2/1985 | Arnold | 250/270 |
| 4,574,193 | 3/1986 | Arnold et al. | 250/270 |
| 4,580,050 | 4/1986 | Paap | 376/166 |
| 4,737,636 | 4/1988 | Smith, Jr. | 250/269 |

OTHER PUBLICATIONS

"Use of Pulsed-Neutron Sources for Flow Measurements in Reactor Research" by Paul Kehler, American Nuclear Society Trans., pp. 141-142, 30 Nov. 1978.
"Advances in Nuclear Production Logging" by P. A. Wichmann et al., Trans., SPWLA (1967).
"Quantitative Monitoring of Water Flow Behind and in Wellbore Casing" from D. M. Arnold and H. J. Paap, SPE, Jan. 1979.
"Examples of Detection of Water Flow by Oxygen Activation on Pulsed Neutron Logs" by W. H. M. DeRosset, in Paper CCC of SPWLA Twenty-Seventh Annular Logging Symposium, Jun. 9-13, 1986.
"Measuring Behind Casing Water Flow" by T. M. Williams, presented on May 5-7 at the International Symposium on Subsurface Injection of Oilfield Brines, in New Orleans.
"The Oxygen Activation Log, a Laboratory Evaluation" by H. J. Paap et al., Proceedings of the International Symposium on Class I & II Injection Well Technology, May 8-11, 1989, pp. 25-43.
"Practical Experience with Oxygen Activation Logging in South Mississippi" by J. B. Wienseneck, Id., pp. 7-24.
"The Aluminum Activation Log" by H. D. Scott and M. P. Smith, in the Log Analyst, Sep.-Oct. 1973, pp. 3-12.
"New Instrumentation and Interpretive Methods for Identifying Shielded Waterflow Using Pulsed Neutron Technology" by F. L. Hill III et al., Twelfth Formation Evaluation Symposium, Sep. 26-29, 1989, Calgary, Alberta, Canada Paper S.

*Primary Examiner*—Brooks H. Hunt
*Assistant Examiner*—Frederick H. Voss
*Attorney, Agent, or Firm*—Henry N. Garrana; Frederic C. Wagret

[57] ABSTRACT

The invention relates to an apparatus for detecting and measuring water production in oil and gas wells and in injection wells, involving a neutron source for activating oxygen atoms in any water produced or injected in the well, and a plurality of detectors, at least three (3) but preferably four (4), longitudinally spaced within the housing for detecting and counting gamma ray emissions resulting from the oxygen activation.

9 Claims, 1 Drawing Sheet

OXYGEN ACTIVATION DOWNHOLE TOOL

FIELD OF THE INVENTION

Oxygen activation measurement is most useful for locating moving water behind casing. The field of this invention is analysis of producing wells and mechanical integrity tests of injection wells.

BACKGROUND OF THE INVENTION

Oxygen activation can be used very effectively for determining the source of unwanted water production in producing oil and gas wells. Since the oxygen activation measurement is strictly tied to the presence of water, its ability to detect primarily water movement behind the casing is invaluable. Production Logging ("PL") equipment cannot resolve this kind of problem because PL sensors measure flow rate and density within the wellbore after hydrocarbon production from the zone of interest has commingled with water production, which may have come into the wellbore through a channel in the cement, either above or below the zone of interest.

An oxygen atom, when excited by high-energy neutrons, will emit gamma ray emissions to allow the atom to return to a ground state. The characteristic emission levels from this reaction are at 6.13 MeV 68% of the time and 7.12 MeV 4.9% of the time. The other 26% of the time, the atom returns directly to the ground state without an emission. The gamma ray population, after excitation has ceased, will decay exponentially, losing one-half of the total counts every 7.13 seconds. This 7.13-second period of time is called the half-life of oxygen activation. The percentage of counts existing at certain periods of time after neutron bombardment has ceased can be estimated from Table 1.

TABLE 1

| GAMMA RAY POPULATION | |
|---|---|
| % OF TOTAL COUNTS | SECONDS AFTER BURST |
| 50. | 7.13 |
| 25. | 14.26 |
| 12.5 | 21.39 |
| 6.25 | 28.52 |
| 3.125 | 35.65 |
| 1.5625 | 42.78 |

In addition to the decrease in counts available for counting due to the half-life decay of the emissions, the gamma rays that are emitted also undergo a reduction in energy level as they collide with other elements that lie between the point of emission and the detector of the tool. A large percentage of these counts will have energy levels substantially below the 6.13 or 7.13 MeV levels when the counts were emitted.

To enable the tool to be used effectively for evaluating producing wells, it must be able to monitor both upgoing and downgoing water channels. This can be accomplished only if the neutron source is positioned above the detectors as well as being able to log in the traditional neutron-source-below position. The tool can be inverted and sent downhole so that it can measure both upgoing and downgoing channels.

Prior art oxygen activation tools disclose the use of two detectors. Typical of such devices are shown in U.S. Pat. No. 4,737,636. This patent discloses a tool provided with two gamma detectors, $D_1$, $D_2$, and an ancillary gamma detector to measure background levels of radiation in the borehole. U.S. Pat. No. 3,603,795 discloses an oxygen activation downhole tool which includes a neutron source and two gamma ray detectors. U.S. Pat. No. 4,233,508 discloses a similar device for a water-injection profiling system with two detectors. U.S. Pat. Nos. 4,223,218; 3,603,795; and 3,979,300 also disclose a two-detector device. U.S. Pat. No. 4,743,755 also discloses a two-detector device, as does a paper entitled "Measuring Behind Casing Waterflow," by T. M. Williams of Texaco, Inc., given at the International Symposium on Subsurface Injection of Oilfield Brines in New Orleans, on May 5–7, 1987.

Also of interest in general background-type information regarding measurement of water flow behind and in wellbore casing is an article by D. M. Arnold and H. J. Paap entitled "Quantitative Monitoring of Water Flow Behind and In Wellbore Casing," published in the Jan. 1979 issue of the *Journal of Petroleum Technology*.

Also of interest regarding the field of invention is a paper published by W. H. M. DeRosset entitled "Examples of Detection of Water Flow by Oxygen Activation on Pulsed Neutron Logs." The paper emphasizes detection techniques, such as controlling the relative velocity of the tool to the water velocity in an effort to maximize the gamma response from activation. The technique deals with logging the well under static and flow conditions or logging a different tool speeds in a flowing well. The disclosure indicates a two-detector tool.

An article by P. A. Wichmann, entitled "Advances in Nuclear Production Logging," published in the SPWLA Transactions (1967), deals with use of gate which allows a gamma ray discriminator to be set at a lower value, which in turn substantially increases the count rate as shown in FIG. 4. Three gates are employed only for this purpose.

U.S. Pat. No. 4,327,290 relates to a method and apparatus for the cyclical timing of the neutron bursts, spectral gates, tau determination gates, and background measurement periods in a capture spectroscopy measurement. U.S. Pat. No. 3,887,805 discusses a neutron logging tool involving two neutron detectors, coupled with a third neutron detector, or its physical equivalent, positioned within the tool at a distance relative to the neutron source and the other detector, which enables changes in the signal from the third detector caused by variations in the borehole environment to be generally distinguishable from changes in signal from at least one of the other detectors. The signals from the third detector and one of the two other detectors are combined in order to compensate for the influence of borehole environment. The patent teaches the two detectors spaced approximately 13 and 15 inches, respectively, from the neutron source, with the third detector being closer to the neutron source and located in such a manner that the response to borehole variations as to the closest detector to the neutron source is different from the changes in signal from the other detector. The tool obtains readings from only two of the three detectors in an effort to compensate for the influence of the borehole environment.

In a paper by G. Lamb and G. Webber, presented at the SPWLA 24th Annual Logging Symposium in Jun. of 1983, entitled "Measurement of Water Flow in Deviated Production Wells by Oxygen Activation Logging," a tool is discussed having a neutron source and two gamma detectors at 40 and 61 centimeters, respectively, from the source. A third detector is used for natural gamma measurements and is spaced at 5.76 meters from the source. The paper indicates that the natural gamma detector can be usable for oxygen activation flow measurements. The paper indicates that the two near detectors are unusable due to direct activation of water in their vicinity. In order to make comparisons of the counts of the natural gamma and the far detectors, their different responses can be accounted for by scaling the response of the natural gamma detector to match that in the far detector, using the ratio of their responses in a radioactive shell.

The process of determining the presence and origin of water channeling behind the casing in a producing well is ideally suited to oxygen activation. The technique can determine where water flow exists behind casing while the well is under production. A properly designed tool should be able to detect water flow of various rates without contaminating production, damaging clays, or cutting off production.

The Environmental Protection Agency ("EPA") has a system whereby it classifies all injection wells in the United States. The main classification of immediate interest is the Class II well used by oil producers either for enhanced oil recovery ("EOR") or salt water disposal. The EPA, through various laws enacted by the U.S. Congress over the last several years, requires that operators of Class II wells verify that the injection operations are not contaminating underground sources of drinking water ("USDW"). The EPA regulations specifically require that a well have no "significant leak," but have not specified what volume of leak is "significant" to date. In other words, if a leak can be detected, then it is "significant" and must be eliminated. The EPA requires a Mechanical Integrity ("MI") test on each well every five years to prove that no leak exists from either the inject zone or an intervening zone to an USDW. An intervening zone is any zone between the inject zone and the USDW. Additionally, if there is another well of any type within the area of review of an injection well, the EPA requires the operator of that well to also prove that no fluids can migrate through that well to USDW's.

The need to measure down to very low (a few ft/min.) and very high fluid velocities has prompted those in the field to produce tools to accomplish this purpose. Recently proposed is a tool which had previously been used exclusively for formation testing. This tool has a neutron source and two gamma ray detectors. The tool is also outfitted with gates which regulate the cycling of the neutron source and the measurement time at the various detectors. This tool was set up for a sequence of approximately twenty to thirty short cycles of measurement, followed by one long cycle. The tool is calibrated by placing it in a zone which is assumed to be free of water flow, but otherwise showing characteristics identical to those of the region of the well under investigation. These short measuring periods are of insufficient length to get accurate background measurements. Accordingly, there is a statistical inaccuracy in the measurements, especially in a situation involving low count rates. Statistically, this tool is able to take meaningful measurements of the background level of radiation only approximately 17% of the time.

The apparatus and method of the present invention seek to optimize background measurements to reduce statistical error and make the oxygen activation measurements more accurate. In accomplishing this optimization objective, the additional detectors are used. The use of the additional detectors improves the rangeability of the tool to approximately a range of water flow rates of about 1½ ft/min. to about 50 ft/min. In furthering such optimization of measurements, the tool is equipped to take meaningful background measurements more frequently than the above-mentioned known tool, thereby making the oxygen activation measurements more meaningful.

SUMMARY OF THE INVENTION

The invention relates to an apparatus for measuring water production in oil and gas wells, involving a neutron generation source for activating oxygen found in any water produced or injected into the well, and a plurality of detectors involving at least three (3) but preferably four (4) longitudinally spaced within the housing for detecting and counting gamma ray emissions resulting from the oxygen activation.

BRIEF DESCRIPTION OF THE PREFERRED EMBODIMENT

Figures 1, 2:
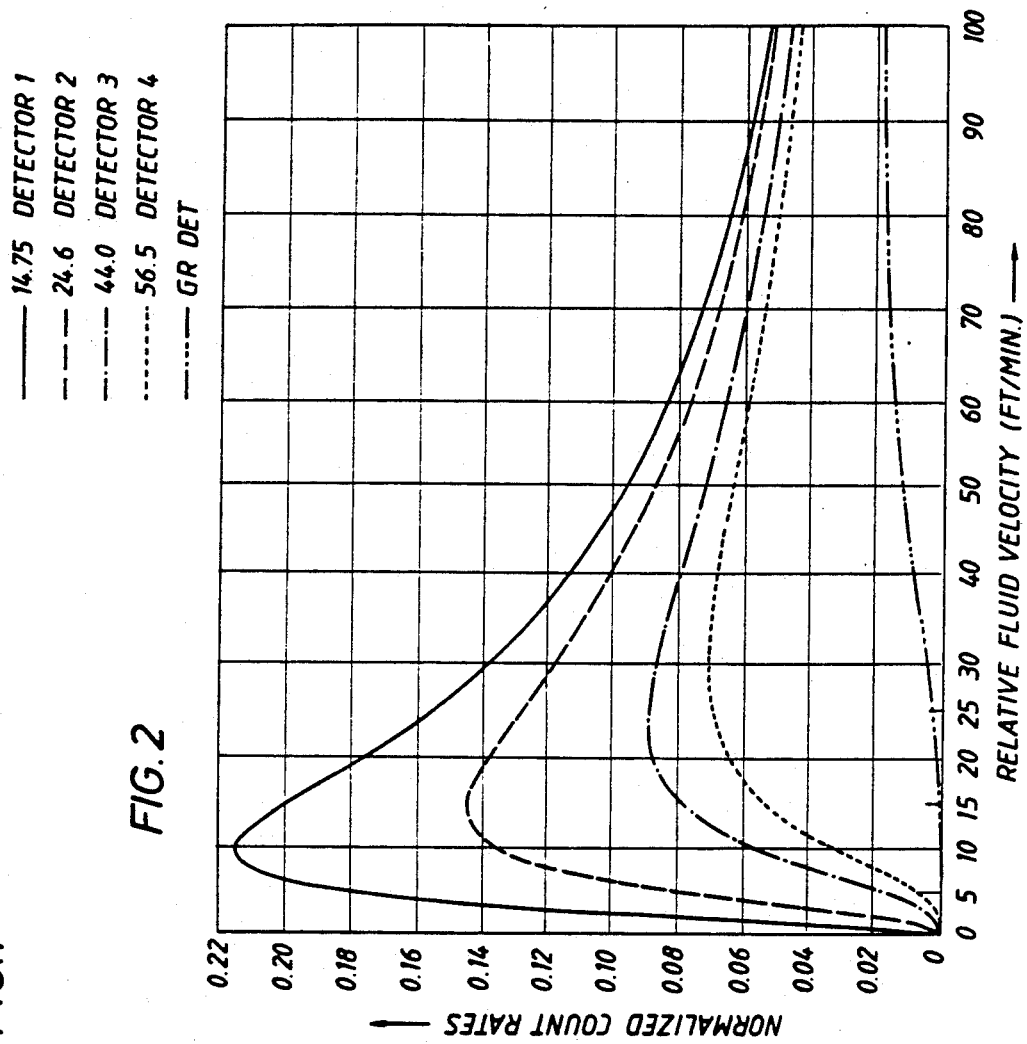
FIG. 1 is a schematic representation of the tool, showing the neutron generation source and the detectors.
FIG. 2 is a plot of the effect of relative velocity on the measured count rates with the preferred detector spacing.

The challenge of oxygen activation is to measure activation counts which are moving in the channel behind the casing before those counts diminish to an energy and population level where they cannot be detected. With various injection rates and channel volumes, water will move within a channel at varying fluid velocities. In channel constrictions, water velocity will increase given a constant flow rate. Conversely, in a washout or large channel, the fluid velocity will decrease. It can be seen that the distance the counts will travel before decaying to zero will be changing while logging, although the distance the detectors are spaced from the neutron source will remain fixed. Whenever the fluid velocity does not coincide with the spacing of the detectors, the count rates received by those detectors will be near zero. To solve this detection problem, according to the invention, several detectors are spaced so that for various fluid velocities, one can acquire gamma ray counts before they decay below a given threshold percentage of their original population, ranging from 3% to 10%, and preferably approximating 6.25%.

To maintain high count rates, a tool T, with three, and preferably four, gamma detectors 10, 12, 14 and 16, at the proposed spacings shown below, is adapted to be suspended in and moved through the casing 20 by an armored cable. The gamma ray detectors are known per se, and may be, e.g., of the NaI Tl or BGO type. By placing four detectors at these preferred longitudinal spacings from a neutron source 18, the number of counts received under a wide range of fluid velocities can be maximized. The source 18 is, e.g., an electronic generator of the type which generates discrete pulses of fast neutrons (14 MeV), and may be of the type described in U.S. Pat. Nos. 2,991,364 or 3,596,572, which are herein incorporated by reference. A chart of the theoretical count-rate response of these detector spacings is included as FIG. 2. The detector spacings for a prior art tool are also shown.

| DETECTOR SPACINGS PREFERRED EMBODIMENT | PRIOR ART DETECTOR SPACINGS |
|---|---|
| $D_1$ - 14.75" | $D_1$ - 27" |
| $D_2$ - 24.6" | $D_2$ - 42.75" |
| $D_3$ - 44" | |
| $D_4$ - 56.5" | |

The preferred spacings can vary by about ±15 percent, without departing from the spirit of the invention.

When measuring these count rates, it must be ensured that the count rates that are acquired are strictly from the effect of oxygen activation and not from other sources of gamma ray emission. Other sources of gamma ray emission include steel activation, NaI detector activation, as well as formation or background radiation. Steel activation occurs in the well while logging and emits 1.8 MeV gamma rays while decaying with a 2.5-hour half-life. NaI detector activation occurs in the detectors, and this reaction gives off a 2.2 MeV Beta decay with a 25-minute half-life. Detector activation is more of a problem in detectors which are spaced close to the neutron source.

A discriminator is used at the output of the detectors to discriminate all counts of gamma rays which have an energy less than 2.5-3 MeV. This eliminates all counts from the three sources mentioned above. This procedure eliminates a large portion of the counts which were emitted through oxygen activation, but have low energy levels when they reach the detector due to the collisions with other formation elements prior to reaching the detector. This factor puts added emphasis on ensuring that count rates are maximized in every other way to offset this necessary discrimination procedure.

The oxygen activation counts looked for must also be distinguished from gamma rays of capture within the formation. To perform this function, a time delay circuit is engaged to avoid any readings until a period in time from 3000 microseconds to 4500 microseconds after the burst ceases. This should ensure that any capture gamma ray activity is not measured. Due to the long half-life of the oxygen activation counts compared to the half-life of the formation's capture gamma ray activity, the readings obtained should contain only formation background counts and oxygen activation counts. The formation background counts should be relatively small because most background radiation counts will be discriminated out by the 3 MeV discriminator. With this configuration, oxygen activation counts will be measured about 30% of the time that the neutron source is being cycled.

The prior art measures oxygen activation counts only 17.9% of the time. The above-mentioned prior art tool is configured so that it predominantly measures formation effects. It operates on approximately 28 short cycles of one millisecond each, followed by a long seven-millisecond cycle. During the short cycles, the effects of oxygen activation and background are not measured. The background and oxygen activation levels are measured during the seven-millisecond cycle. The net result is that only about 17 percent of the time are there any measurements of oxygen activation or background in the above-mentioned tool.

The apparatus and method of the present invention employ cycles which are longer than the prior art cycles; e.g., several millisecond cycles, and, more particularly, five-millisecond cycles. Due to these longer cycles, the background is more frequently and efficiently measured. The use of the four detectors aids in maximizing total count rates of oxygen activation and the background, thereby statistically diminishing the effectiveness of the background as a percentage of the total measurement. Additionally, the longer cycles allow the background itself to be more accurately measured. When the four detectors are combined with the use of gates, statistical variations in the background itself are made less meaningful in view of the fact that the total number of counts measured is enhanced and the background measurement is also improved due to the longer cycle time.

Typically, readings from the background occur due to the presence of uranium salts or thorium or potassium found in shales. Readings from the formation typically come from the presence of chlorides found in salt water.

The advantage of this design is the increased count rates obtained due to the multiple detectors that are employed. The prior art devices' count rates are very low and yield very high statistics under many conditions. With higher count rates and lower statistics, interpretation of the data will become much more precise. The four-detector arrangement gives answers over a wider span of fluid velocities than the prior art. This would be especially advantageous when evaluating producing wells.

The advantage of the apparatus of the present invention is seen in that it provides a greater span of distances between detectors and the neutron source, which makes it more adept at measuring higher water velocities than the embodiments known in the prior art. Additionally, this same feature enables the apparatus of the present invention to better measure background conditions before any neutron sources are activated, with smaller statistical errors than with the prior art devices. There are various variables that could affect the accuracy of background statistics. These include cement voids and cement thickness variations, as well as how well the cement has bonded to the formation. The apparatus of the present invention, by providing a very short spacing as well as a long spacing, provides flexibility to measure at the shorter detector spacing, which is more sensitive at low flow velocities. The use of the additional detectors in the apparatus of the present invention allows higher velocity water intrusions to be seen, where with prior art devices there would have been an indication of no water flow at all. This occurred due to high velocity of water sweeping activated oxygen beyond the detectors too quickly for the prior art devices to obtain a measurement.

The apparatus and method of the present invention seek to optimize the accuracy of oxygen activation measurements. Two important variables in making accurate oxygen activation measurements are the spacing of the detectors and the frequency of measurement. In the preferred embodiment, these variables are optimized by using the four detectors in the approximate spacing hereinabove indicated. The use of the detectors in this spacing allows for an apparatus and method which can accurately detect water flow rates somewhere in the range of about 1½ to 50 ft/min. The tool further optimizes the oxygen activation measurements by employing time gates included in the electronic circuitry 22 for processing the counts, and by cycling the neutron source 18. The rest of the circuitry 22 is known per se and may be of the type described in U.S. Pat. No. 3,603,795. The time gates are designated time delays which control the length of time the detectors can measure gamma radiation within the wellbore. The above-mentioned prior art tool is set up for a series of approximately twenty-eight short cycles of about one millisecond each, followed by one long cycle of about seven millisecond. It is only during the long cycle that meaningful background measurements can be obtained. The reason for this is that short-measurement durations do not allow for accurate measurement of the total gamma rays in the well due to background as well as oxygen activation. The background gamma ray level can vary somewhat in different portions of the well. It becomes important to measure as many counts as possible, especially in low-velocity waterflow situations where fewer counts are generated. The fewer the counts generated due to oxygen activation, the more statistically significant are the background levels of counts. The apparatus of the present invention seeks to reduce the significance of the effect of the statistical variation of the background counts by longer measurement times which promote higher count rates by optimizing detector spacing to diminish the effect of the background level of gamma rays found in the wellbore. The level of background radiation can vary within a statistical field. For example, background gamma radiation could result in a measurement of four or five counts. In low-velocity waterflow situations where the number of total counts measured is, in itself, low, the effect of the background level of radiation and its own variability become much more statistically significant. However, if the number of counts measured is increased due to the use of four detectors and long measurement cycles, raising the total counts measured decreases the statistical importance of the background level of radiation. Longer measurement cycles yield more repeatable results and their use with four detectors improves the ability to measure more counts, thereby obtaining more statistically meaningful results in low-velocity waterflow situations a greater percentage of the time than prior art tools.

The apparatus and method of the present invention employs longer cycles of detector measurement (5 millisecond) through the use of gates so that, in each time cycle of source activation, oxygen activation readings are obtained. The detectors continue to sense gamma rays in an effort to more continuously determine the background level of gamma radiation in the wellbore. The combination of the four detectors, along with judicious use of the gates, permits the apparatus and method of the present invention to obtain meaningful statistical data about the background level of gamma radiation approximately 30% of the time, as opposed to only about 18% of the time for the tool of the prior art. This is particularly important since there can occur changes in the background level of gamma radiation along the depth of the well.

The foregoing disclosure and description of the invention are illustrative and explanatory thereof, and various changes in the size, shape and materials, as well as in the details of the illustrated construction, may be made without departing from the spirit of the invention.

I claim:

1. An apparatus for detecting and measuring water flow in a well, comprising:
   a housing;
   neutron generation means for activating oxygen atoms in any water flowing in or in the vicinity of said well;
   at least four (4) detector means longitudinally spaced within said housing for measuring gamma rays resulting from operation of said neutron generation means; the spacings between said neutron generation means and said detector means being such that said gamma rays are detected before they decay below a predetermined percentage of their original population and said spacings ranging, respectively, from 12.5" to 17", from 21" to 28.5", from 37.5" to 50.5", and from 48" to 65"; and
   means for deriving characteristics of the water flow from said gamma rays.

2. The apparatus of claim 1 wherein said detector means also serve to sense background gamma radiation levels pre-existing in the well.

3. The apparatus of claim 1, further comprising
   gate means to create a plurality of several millisecond cycles of time during which said detector means measure oxygen activation and background gamma ray radiation levels in the well about 30% of the total cycle time.

4. The apparatus of claim 1, further comprising
   gate means to create a plurality of several millisecond cycles of time during which said detector means measure oxygen activation and background gamma ray radiation levels in the well about 30% of the total cycle time.

5. The apparatus of claim 1, wherein
   a discriminator means eliminates counts of gamma rays which have an energy level of less than about 3 Mev.

6. The apparatus of claim 4, further comprising
   time delay means for preselecting a discrete time band after operation of said neutron generation means for measurements to be made by said detector means.

7. The apparatus of claim 1, further comprising
   discrimination means to substantially exclude from measurement by said detector means gamma ray counts resulting from sources other than oxygen atoms activation.

8. The apparatus of claim 7, wherein
   said discriminator means eliminates counts of gamma rays which have an energy level of less than about 3 Mev.

9. The apparatus of claim 3, further comprising
   time delay means for preselecting a discrete time band after operation of said neutron generation means for measurements to be made by said detector means.

* * * * *